United States Patent
Prouteau et al.

(10) Patent No.: US 6,993,914 B2
(45) Date of Patent: Feb. 7, 2006

(54) CONVERGENT-DIVERGENT TURBOJET NOZZLE

(75) Inventors: Jackie Prouteau, Villecresnes (FR); Raphaël Curtelin, Saint Mery (FR); Guy Lapergue, Rubelles (FR); Didier Feder, Melun (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/915,446

(22) Filed: Aug. 11, 2004

(65) Prior Publication Data

US 2005/0060984 A1    Mar. 24, 2005

(30) Foreign Application Priority Data

Aug. 12, 2003 (FR) .................................. 03 09854

(51) Int. Cl.
*F02K 1/12* (2006.01)

(52) U.S. Cl. .................................... 60/771; 239/265.41

(58) Field of Classification Search ................. 60/770, 60/771; 239/265.19, 265.33, 265.37, 265.39, 239/265.41

See application file for complete search history.

(56) References Cited

U.S. PATENT DOCUMENTS

| | | | | |
|---|---|---|---|---|
| 3,972,475 A | * | 8/1976 | Nelson et al. | 239/127.3 |
| 3,979,065 A | * | 9/1976 | Madden | 239/127.3 |
| 4,081,137 A | | 3/1978 | Sutton et al. | |
| 4,171,093 A | * | 10/1979 | Honeycutt et al. | 239/127.3 |
| 4,203,286 A | | 5/1980 | Warburton | |
| 4,544,098 A | * | 10/1985 | Warburton | 239/127.3 |
| 5,215,257 A | * | 6/1993 | Barcza | 239/265.39 |
| 5,269,467 A | * | 12/1993 | Williams et al. | 239/265.41 |
| 5,775,589 A | | 7/1998 | Vdoviak et al. | |

\* cited by examiner

*Primary Examiner*—Ehud Gartenberg
(74) *Attorney, Agent, or Firm*—Oblon, Spivak, McClelland, Maier & Neustadt, P.C.

(57) ABSTRACT

The present invention relates to a convergent-divergent turbojet nozzle (1) comprising driven divergent flaps (4a), follower divergent flaps (4b) interposed between the driven flaps, and means (32) for supplying cooling air to the follower flaps (4b), said follower flaps (4b) having a box structure and having lateral openings for delivering cooling air towards the inner face of said driven flaps (4a), in such a way as to limit the heating up of these flaps when the turbojet is in operation.

11 Claims, 4 Drawing Sheets

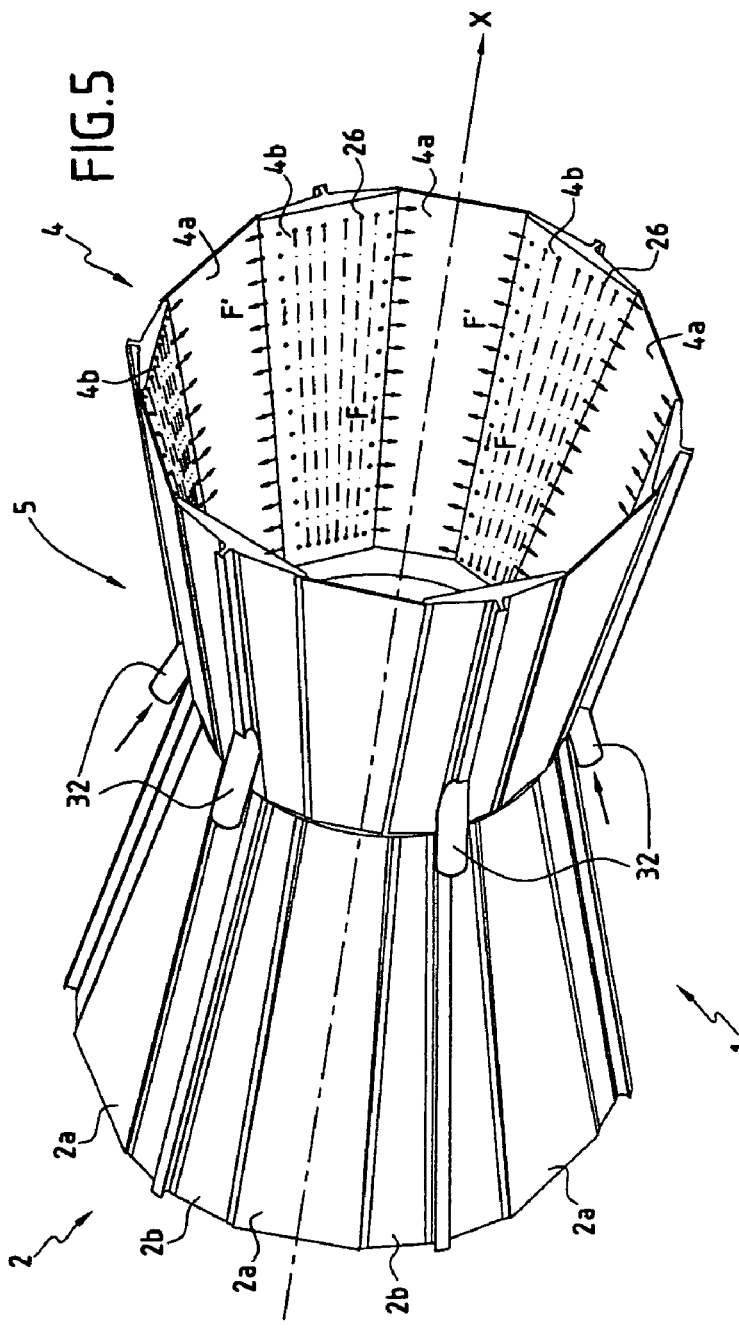
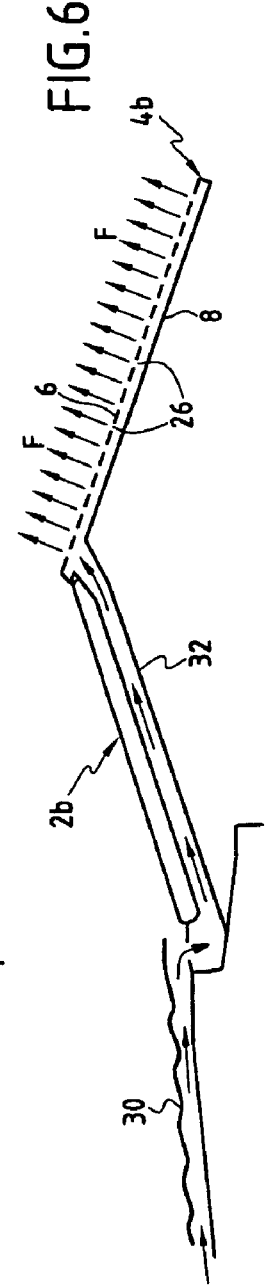

CONVERGENT-DIVERGENT TURBOJET NOZZLE

BACKGROUND OF THE INVENTION

The present invention relates to a convergent-divergent turbojet nozzle. Such convergent-divergent nozzles, referred to in this text as CD nozzles, are generally fitted to military supersonic aircraft turbojets.

FIG. 1 shows diagrammatically a CD nozzle 1 of known type. This nozzle, of axis X, comprises a first ring of convergent flaps 2 and a second ring of divergent flaps 4. Among the convergent 2 and divergent 4 flaps, the driven flaps 2a, 4a are distinguished from the follower flaps 2b, 4b.

The driven flaps 2a, 4a are connected to a drive mechanism 5 which is used to move them. This drive mechanism usually consists of levers, link rods, yokes, or a ring, rollers and cams. The movement of the driven flaps 2a, 4a enables the opening of the nozzle 1 to be modified to suit flight conditions, and for this reason the nozzle is said to be of variable section.

The follower flaps 2b, 4b are interposed between the driven flaps and, on either side, their lateral edges bear on the radially inner faces of the driven flaps 2a, 4a. The follower flaps are not connected to a drive mechanism and simply follow the driven flaps 2a, 4a.

The radial direction is defined in this text as the direction perpendicular to the axis X of the nozzle, and the inner face of an element as the face of the element which is nearest the axis X.

When the turbojet is running, a stream of hot gases is pouring through the nozzle 1 from the post-combustion chamber of the turbojet. By varying the opening of the nozzle, the drive mechanism 5 of the driven flaps 2a, 4a increases or decreases the exhaust velocity of the gaseous stream at the nozzle outlet.

The temperatures of the stream of hot gases passing through the CD nozzle are generally very high, and a number of cooling systems have been developed to limit the heating up of the radially inner faces of the nozzle flaps.

U.S. Pat. No. 5,775,589 discloses a CD nozzle for a military turbojet comprising follower divergent flaps supplied with cooling air.

This air flows through the inside of each flap before escaping through perforations, termed multi-perforations, in the inner wall of the flap. A protective film of air is thus formed against the surface of this wall, limiting the exchange of heat between the latter and said hot gases.

In one particular embodiment, the driven divergent flaps are not supplied with cooling air and therefore have no multiperforations, and only means for injecting air into the throat (the narrowest cross section) of the nozzle are provided to cool these flaps. However, such means are inadequate for properly cooling the driven divergent flaps, especially in regions of these flaps remote from said throat.

SUMMARY OF THE INVENTION

It is an object of the invention to improve the cooling of the driven flaps of a CD nozzle, especially when the driven divergent flaps are not themselves supplied with cooling air.

To achieve this object, the subject of the invention is a convergent-divergent turbojet nozzle comprising driven divergent flaps, follower divergent flaps interposed between the driven flaps, and means for supplying cooling air to the follower divergent flaps, the latter having a box structure with a radially inner wall and a radially outer wall. According to the invention, said follower divergent flaps also have lateral openings for delivering cooling air towards the inner face of said driven divergent flaps, to cool the latter.

The invention thus utilizes some of the cooling air supplied to the follower divergent flaps to cool the inner face of the driven divergent flaps. This is particularly useful when the driven divergent flaps are not themselves supplied with cooling air.

Limiting the heating up of the driven divergent flaps not only increases the life of the components of these flaps but also, in the context of military operations, helps reduce the infrared signature of the aircraft's nozzle.

In one particular embodiment of the invention, the outer and inner walls of the nozzle are fitted one inside the other along their lateral extremities but retain the freedom to slide over each other.

Thus, when the turbojet is running, the mechanical stresses within the flap are limited because said walls can slide over each other. Such mechanical stresses may result for example from differences of expansion between the outer and inner walls, owing to the fact that these walls are subjected to different temperatures.

Additionally, to optimize the performance of a CD nozzle, it is desirable to minimize the leakage of hot gases between the driven divergent flaps and the follower divergent flaps. For this reason, each follower flap must have torsional flexibility so that its lateral edges remain in contact with the inner surface of the two driven flaps on either side of it, even when there is a slight positional difference between these two flaps, which becomes frequent owing to the wear on the drive systems of these flaps. This torsional flexibility is improved by the ability of the external and internal walls to slide over each other.

Furthermore, to promote contact between the lateral edges of the follower divergent flaps and the inner surface of the driven divergent flaps, the lateral extremities of the outer and inner walls are curved.

In one particular embodiment of the invention, the outer and inner walls of the nozzle each have holes along their lateral extremities. The holes of one of the walls are aligned with the holes of the other wall when these walls are fitted one inside the other, and thus form said lateral openings.

Advantageously, the holes of one of the walls have a larger cross section than the holes of the other wall, so that the hole of smaller cross section always leads into the inside of the hole of larger cross section, whatever the position of the inner and outer walls relative to each other. This ensures the continued existence of lateral openings when the inner and outer walls slide over each other due to phenomena of expansion or twisting of the flap.

In one particular embodiment of the invention, the inner and outer walls of the follower divergent flaps each have at least one incision leading all the way in from their lateral periphery to one of said holes.

Such an incision makes it possible to reduce the mechanical stresses within the flap linked to expansion of the walls, or to twisting of the flap. Furthermore, as each incision leads into one of said holes, the development of cracks at the end of each incision is avoided.

In one particular embodiment of the invention, each follower divergent flap also comprises a spacer, situated between its inner wall and its outer wall, in the plane of symmetry of the flap. This spacer reinforces the structure of the flap and enables it to retain its shape even when the pressures exerted on its inner wall by the stream of hot gases passing through the nozzle are high.

Advantageously, each follower divergent flap of the nozzle also comprises a guide rail fixed to the outer wall of said flap, the cross section of said spacer is in the general shape of an I, the base of the spacer being fixed to the inner wall of said flap, and its upper part being able to slide in said guide rail.

This particular structure allows the inner wall of the flap to move relative to its outer wall. The invention thus succeeds in reinforcing the structure of the flap while maintaining its flexibility.

In one particular embodiment of the invention, the radially inner wall of the follower divergent flaps also has perforations through which the cooling air can escape. This makes it possible to create a protective film of air against the surface of the flap.

In another embodiment of the invention, said driven divergent flaps are not supplied with cooling air, and are therefore cooled only by the lateral openings present in the follower flaps.

This embodiment greatly simplifies the structure of the CD nozzle because it makes it possible to produce driven divergent flaps that do not have a hollow box structure that would be needed for the passage of cooling air. Instead, it is possible to produce flaps with a simple skin structure, that is a single wall. It is then easy to connect this type of driven flap to the drive members which control it.

BRIEF DESCRIPTION OF THE DRAWINGS

A clearer understanding of the invention and its advantages will be gained from a reading of the detailed description of a preferred embodiment, illustrated in the following figures:

FIG. 5 is a perspective view of a CD nozzle according to the invention; and

FIG. 6 shows diagrammatically, in axial half-section, a CD nozzle according to the invention.

DETAILED DESCRIPTION OF THE INVENTION

Figure 1:
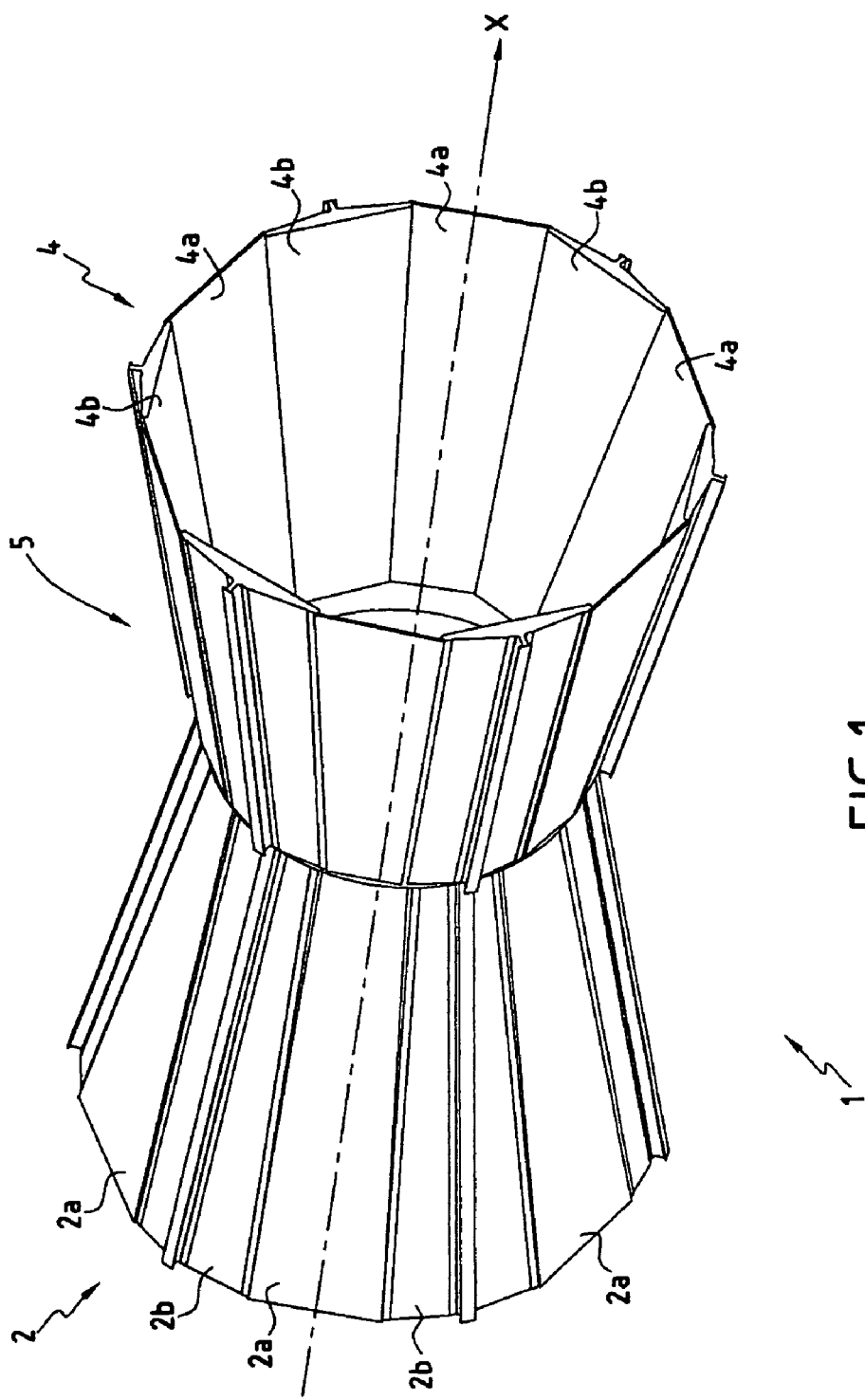
FIG. 1 is a perspective view of a CD nozzle of the prior art.

The general structure of the nozzle according to the invention is similar to that of the nozzle shown in FIG. 1 and described earlier.

The nozzle 1 comprises convergent flaps 2 and divergent flaps 4. Among the divergent flaps 4, the driven divergent flaps 4a are distinguished from the follower divergent flaps 4b. Each follower divergent flap 4b bears on the two adjacent driven divergent flaps in a region situated along its lateral edges.

The driven divergent flaps 4a are pivoted at their upstream ends to the downstream ends of the driven convergent flaps 2a, and the follower divergent flaps 4b are also pivoted at their upstream ends to the downstream ends of the follower convergent flaps 2b.

Figure 2:
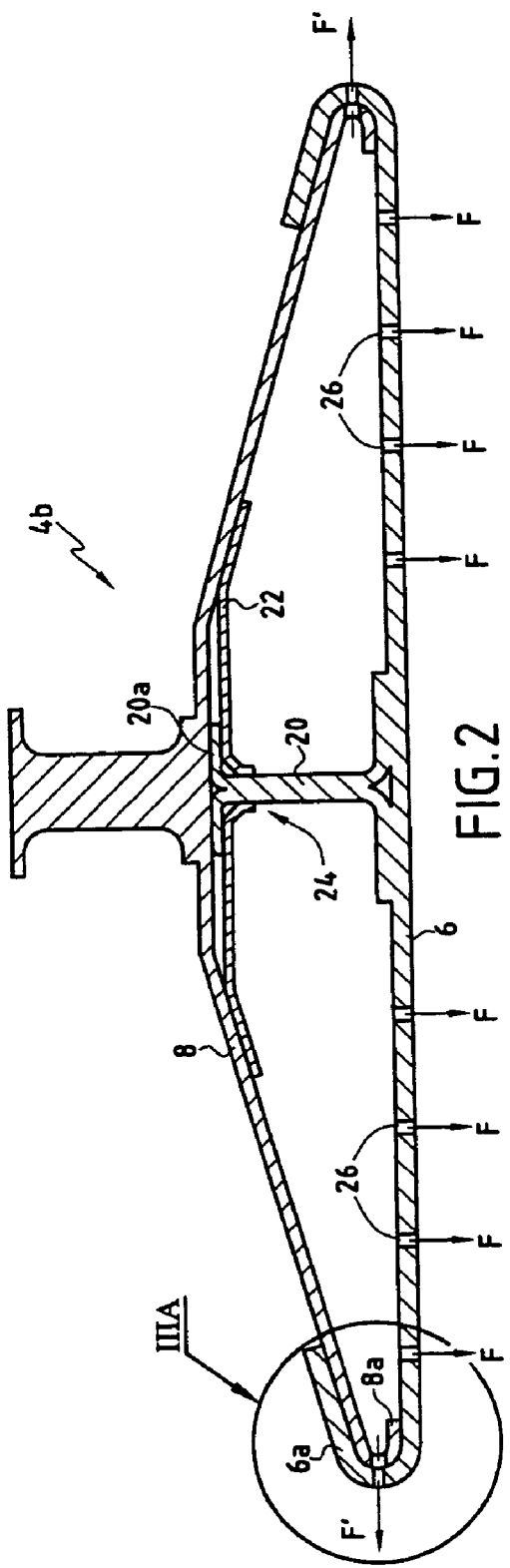
FIG. 2 is a cross section of a follower divergent flap of a nozzle according to the invention.

Each follower divergent flap 4b has a box structure, and an approximately trapezoidal cross section, shown in FIG. 2, with a radially inner wall 6, and a radially outer wall 8.

The lateral extremities 8a of the outer wall 8 and the lateral extremities 6a of the inner wall 6 are curved and the curvatures of the lateral extremities 6a and 8a are such that the inner and outer walls 6 and 8 can be fitted one inside the other, the extremities of the inner wall 6a covering those of the outer wall 8.

Also, the lateral extremities 6a of the inner wall 6 form a slideway for the lateral extremities 8a of the outer wall 8, with the result that these walls can slide over each other in the axial direction.

The lateral edges of the follower divergent flap 4b are therefore formed by the overlapping of the lateral extremities of the inner 6 and outer 8 walls.

The follower flap 4b is also fitted with several spacers 20 distributed at regular intervals along the flap between the inner wall 6 and the outer wall 8, in the plane of symmetry of the flap.

Each spacer 20 consists of a rectilinear web joined to a base and to an upper part, these both being perpendicular to the web, and the cross section of the spacer being in the general shape of an I. The base of the spacer is attached by welding, brazing or any other appropriate fixing means to the inner wall 6 of the flap. The upper part of the spacer 20 is composed of two arms 20a which spread out on either side of the web of the spacer 20, at right angles to the direction of this web.

Fixed to the outer wall 8 of the flap is an axial slideway 22, or guide rail, containing a slot 24 lying in the plane of symmetry of the flap. The width of the slot 24 is greater than the thickness of the web of the spacer 20, and the spacer 20 can therefore slide in the slideway 22 along the direction of the slot. The arms 20a of the spacer 20 extend between the slideway 22 and the outer wall 8, and are able to contact one or other of these parts to limit how far the inner 6 and outer 8 walls can come together or move apart, thereby improving the ability of the flap to maintain its shape.

Figure 3B:
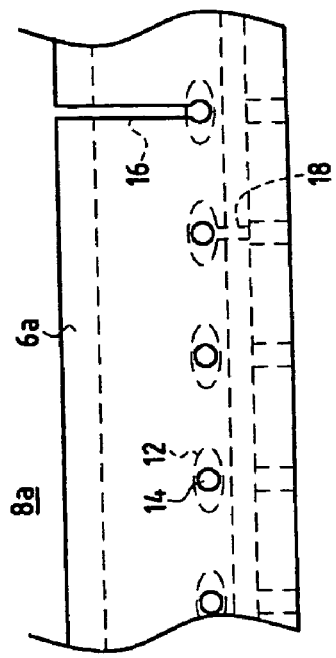
FIGS. 3a and 3b are detail views of the lateral openings of the flap of FIG. 2.
Figure 3A:
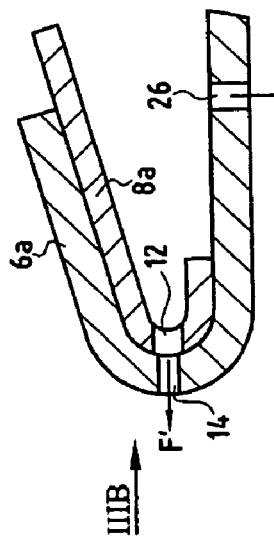

As shown in FIGS. 3a and 3b, the inner and outer walls 6, 8 each have holes 12, 14 set out at regular intervals along their lateral extremities 6a, 8a.

When the walls 6, 8 are fitted one inside the other, the holes 12 of the outer wall 8 are aligned with the holes 14 of the inner wall 6, and thus form lateral openings in the structure of the follower flap 4b.

The holes 12 of the outer wall 8 are oblong, i.e. elongated, and have a larger cross section than the circular holes 14 of the inner wall 6. The size and shape of the oblong holes 12 are determined in such a way that the circular holes 14 are never masked, even when the outer 8 and inner 6 walls expand differently and/or when the follower flap 4b twists and causes a displacement of the two walls 6 and 8 relative to each other.

Moreover, the inner and outer walls 6, 8 are provided with incisions 16 and 18, respectively, situated at regular intervals along their lateral extremities 6a and 8a. These incisions 16 and 18 start on the edge of the lateral extremities 6a, 8a and extend in at right angles to this edge all the way to the holes 12 and 14 formed in each of the walls 6 and 8.

Figure 4:
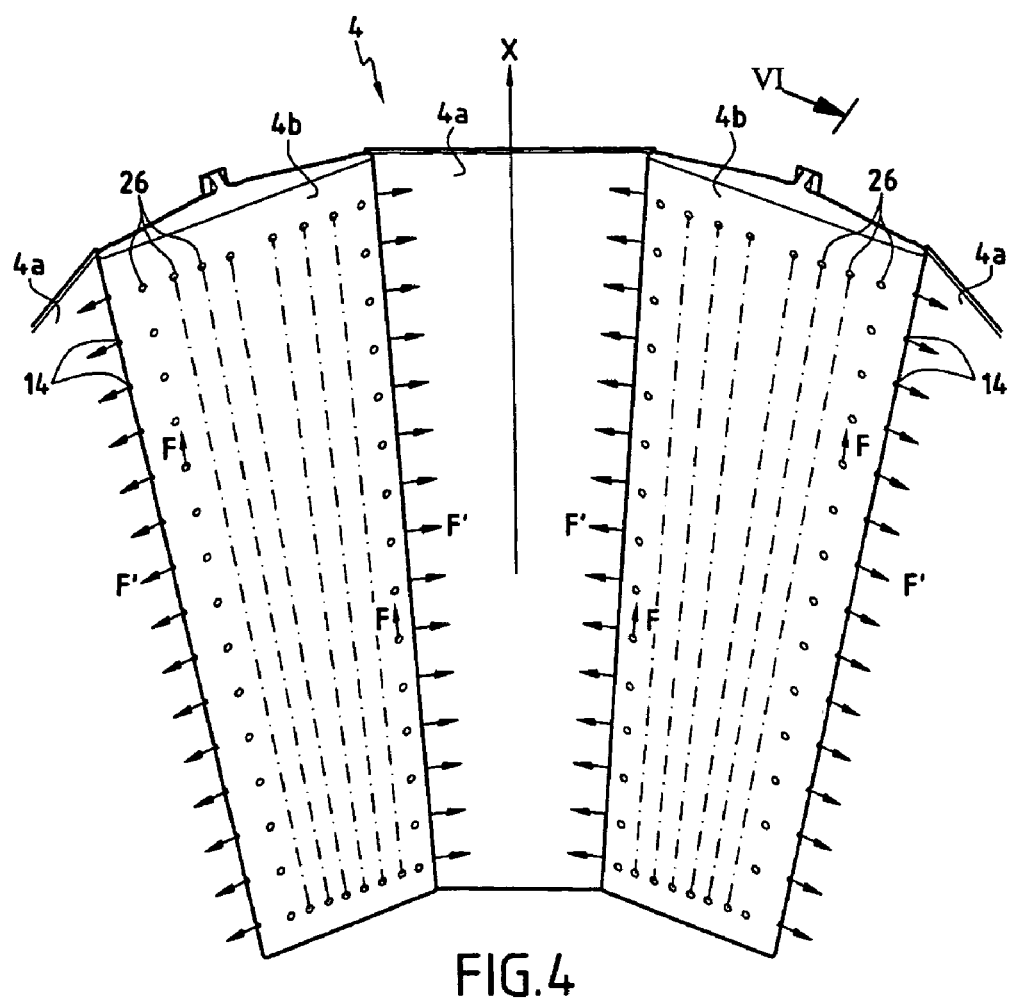
FIG. 4 shows some divergent flaps of a nozzle according to the invention, viewed from the inside of the nozzle.

As shown in FIGS. 2 and 4, the inner wall 6 of each follower flap 4b has numerous perforations 26 in its central part. These are termed multiperforations.

Referring to FIGS. 4, 5 and 6, when the driven flaps 4a are not supplied with cooling air, and only the follower flaps are so supplied, the cooling of the divergent flaps of the nozzle described earlier takes place in the following manner.

The cooling air of the follower divergent flaps 4b comes from a manifold (not shown) positioned upstream of the nozzle, referring to the direction of flow of the hot gases passing through it. The air drawn off is channelled into the follower divergent flaps 4b, as shown diagrammatically in FIG. 6, passing on its way under a thermally protective sleeve 30 of the turbojet upstream of the nozzle, and via a system of ducts 32. The air then flows into the box structure of the divergent flaps 4b and passes out through the perforations 26 and lateral openings 12, 14 of said divergent flaps 4b.

The cold air passing out through the perforations 26 in the direction indicated by the arrows F serves to limit the heating up of the inner walls 6 of the follower divergent flaps 4b by creating a film of cool air on the inner face of these walls.

Cold air that passes out through the lateral openings 12, 14 in the direction of arrows F', on the other hand, is directed circumferentially towards the inner face of each of the driven divergent flaps 4a and initially cools them by impact. Subsequently this cold air creates a protective film against the inner face of the driven divergent flaps 4a, thereby attenuating the heat exchanges between the hot gases passing through the nozzle and these flaps 4a, thus limiting the degree to which they heat up.

What is claimed is:

1. Convergent-divergent turbojet nozzle comprising driven divergent flaps, follower divergent flaps interposed between the driven divergent flaps, and means for supplying cooling air to the follower divergent flaps, wherein said follower divergent flaps have a box structure with a radially inner wall and a radially outer wall, and have lateral openings for delivering cooling air towards the inner face of said driven divergent flaps, to cool the latter.

2. Nozzle according to claim 1, wherein the outer and inner walls are fitted one inside the other along their lateral extremities but retain the freedom to slide over each other.

3. Nozzle according to claim 2, wherein said lateral extremities of the outer and inner walls are curved.

4. Nozzle according to claim 2, wherein the outer and inner walls each have holes along their lateral extremities, and in that the holes of one of the walls are aligned with the holes of the other wall when these walls are fitted one inside the other, therefore forming said lateral openings.

5. Nozzle according to claim 4, wherein the holes of one of the walls have a larger cross section than the holes of the other wall.

6. Nozzle according to claim 5, wherein the holes of one of the walls are oblong, while the holes of the other wall are circular.

7. Nozzle according to claim 4, wherein the outer and inner walls each have at least one incision leading from their lateral periphery to one of said holes.

8. Nozzle according to claim 1, wherein each follower divergent flap also comprises a spacer, situated between its inner wall and its outer wall, in the plane of symmetry of said follower divergent flap.

9. Nozzle according to claim 8, wherein each follower divergent flap also comprises a guide rail fixed to the outer wall of said flap, and in that said spacer is in the general shape of an I, its base being fixed to the inner wall of said flap, and its upper part being able to slide in said guide rail.

10. Nozzle according to claim 1, wherein said radially inner wall of the follower divergent flaps also has perforations through which the cooling air can escape.

11. Nozzle according to claim 1, wherein said driven divergent flaps are not supplied with cooling air.

* * * * *